June 5, 1923.

J. G. BLUNT 1,457,893

TRUCK BOX CELLAR

Filed Oct. 1, 1921

Patented June 5, 1923.

1,457,893

UNITED STATES PATENT OFFICE.

JAMES G. BLUNT, OF SCHENECTADY, NEW YORK.

TRUCK-BOX CELLAR.

Application filed October 1, 1921. Serial No. 504,591.

*To all whom it may concern:*

Be it known that I, JAMES G. BLUNT, of Schenectady, in the county of Schenectady and State of New York, have invented a certain new and useful Improvement in Truck-Box Cellars, of which improvement the following is a specification.

My invention particularly relates to journal boxes of locomotive trucks of the type in which said boxes are located outside of the wheels, as is usually the case in trailing trucks, and its object is, primarily, to provide a cellar which will be held firmly in place while in service, and be readily removable, when required, for the quick application of a new journal bearing. A further object of my invention is to enable the entrance of dust and other foreign matter, to be intercepted, as the journal bearing wears and allows the cellar to drop away from the under side of the journal.

The improvement claimed is hereinafter fully set forth.

Figure 1:
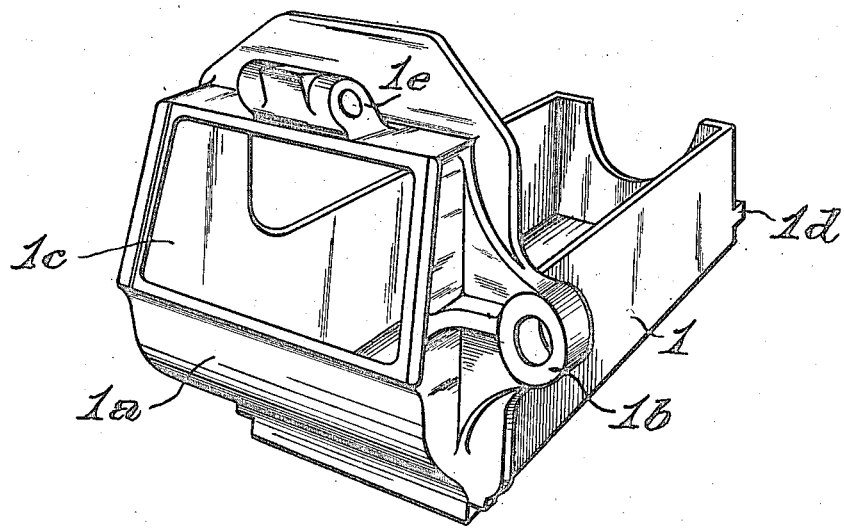
Figure 2:
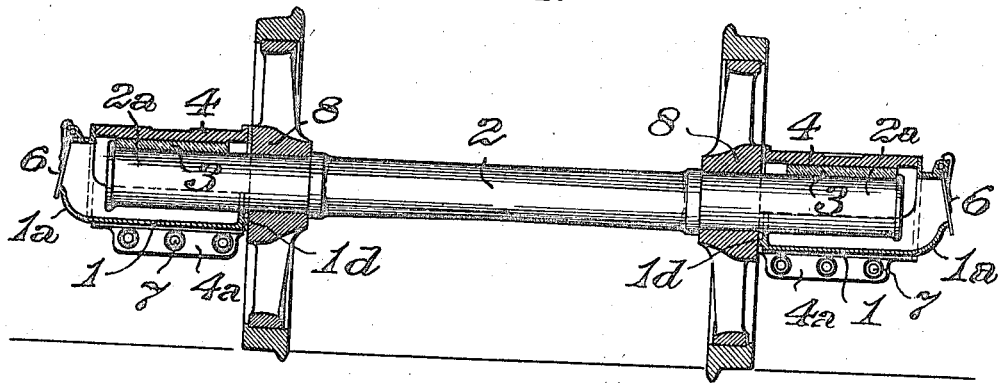
Figure 3:
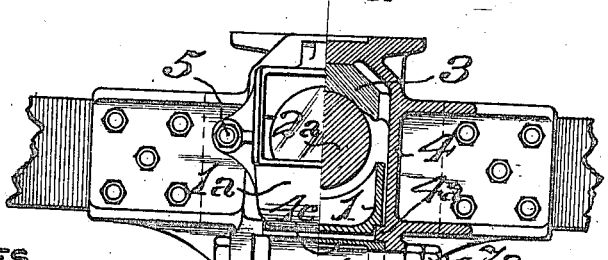

In the accompanying drawing: Figure 1 is a view, in perspective, of a truck box cellar, illustrating an embodiment of my invention; Fig. 2, an axial section through a locomotive truck in which said truck box cellar is applied; and, Fig. 3, a view, half in front elevation and half in transverse section, of the truck box and cellar.

In the practice of my invention, referring descriptively to the specific embodiment thereof which is herein exemplified, the main body, 1, of the cellar, is of substantially the ordinary form, that is to say, is an open topped rectangular box or case, the rear end wall of which is segmentally recessed to fit around the portion of the truck axle, 2, which projects outside of the wheel hub. The journal bearing, 3, is, as usual, fitted between the journal, 2$^a$, and the top of the journal box, 4, which box is entirely open at its outer end, and the cellar is located at the bottom of the box, and supported on flanges, 4$^a$, projecting from the inner sides of its walls.

The closure of the front end of the journal box, 4, is effected by a front plate, 1$^a$, which is cast integral with the main body, 1, of the cellar, and the latter is removably secured to the journal box by bolts, 5, passing through lugs, 1$^b$, on the front plate, and having nuts on their outer ends. An opening, 1$^c$, through which packing material may be inserted in, and removed from, the cellar, is formed in the front plate, said opening being closed by a door, 6, of any suitable and preferred known construction, which is connected to the front plate by a bolt passing through a lug, 1$^e$, thereon. The cellar is held firmly in position by transverse bolts, 7, passing through flanges, 4$^b$, depending from the side walls of the journal box, and through an interposed thimble, 4$^c$, and provided with nuts, 7$^a$.

In order to prevent the entrance of dust or other foreign matter into the cellar, as the journal bearing wears away and allows the cellar to drop away from the under side of the journal, a dust protecting rib, 1$^d$, is cast on the inner end thereof, near its bottom, said rib abutting against the adjoining face of the hub of the truck wheel, 8, continuously during the service of the cellar.

I claim as my invention and desire to secure by Letters Patent:

In combination with a journal box for locomotive trucks located outside the wheel, and entirely open at its outer end, of a truck box cellar consisting of an open topped casing, the rear end wall of which is recessed to fit the axle and carries a flange abutting the wheel hub, internal flanges at the bottom of said box on which the cellar is supported, a front plate integral with the collar casing closing the open outer end of the box and having a door through which packing material may be inserted, bolts passed through lugs on said front plate to secure the cellar to the box, and transverse bolts passed through depending flanges on the side walls of the box to clamp the cellar in place.

JAMES G. BLUNT.

Witnesses:
R. F. HALL,
J. HOWARD WAGAR.